United States Patent
Lee et al.

(10) Patent No.: US 11,330,227 B2
(45) Date of Patent: May 10, 2022

(54) ELECTRONIC DEVICE FOR COMPRESSING IMAGE ACQUIRED BY USING CAMERA, AND OPERATION METHOD THEREFOR

(71) Applicant: SAMSUNG ELECTRONICS CO., LTD., Gyeonggi-do (KR)

(72) Inventors: Arang Lee, Gyeonggi-do (KR);
Sungoh Kim, Gyeonggi-do (KR);
Youngjo Kim, Gyeonggi-do (KR);
Hyunhee Park, Gyeonggi-do (KR);
Hyungju Chun, Gyeonggi-do (KR);
Jongbum Choi, Gyeonggi-do (KR);
Changsu Han, Gyeonggi-do (KR);
Hajoong Park, Gyeonggi-do (KR);
Donghyun Yeom, Gyeonggi-do (KR)

(73) Assignee: Samsung Electronics Co., Ltd

( * ) Notice: Subject to any disclaimer, the term of this patent is extended or adjusted under 35 U.S.C. 154(b) by 73 days.

(21) Appl. No.: 16/969,107

(22) PCT Filed: Feb. 12, 2019

(86) PCT No.: PCT/KR2019/001703
§ 371 (c)(1),
(2) Date: Aug. 11, 2020

(87) PCT Pub. No.: WO2019/156538
PCT Pub. Date: Aug. 15, 2019

(65) Prior Publication Data
US 2021/0044775 A1  Feb. 11, 2021

(30) Foreign Application Priority Data

Feb. 12, 2018  (KR) .................. 10-2018-0017103

(51) Int. Cl.
*H04N 5/917* (2006.01)
*H04N 5/232* (2006.01)

(52) U.S. Cl.
CPC ......... *H04N 5/917* (2013.01); *H04N 5/23229* (2013.01)

(58) Field of Classification Search
CPC ...... H04N 5/917; H04N 5/23229; H04N 5/77; H04N 5/772; H04N 9/8042; H04N 19/115;
(Continued)

(56) References Cited

U.S. PATENT DOCUMENTS

2011/0090364 A1  4/2011  Alvarez et al.
2011/0255602 A1*  10/2011  Kondo ................. H04N 19/61
375/240.16
(Continued)

FOREIGN PATENT DOCUMENTS

KR  1020140092517  7/2014
KR  1020160131882  11/2016
(Continued)

OTHER PUBLICATIONS

PCT/ISA/210 Search Report issued on PCT/KR2019/001703, dated May 24, 2019, pp. 5.
(Continued)

*Primary Examiner* — Hung H Lam
(74) *Attorney, Agent, or Firm* — The Farrell Law Firm, P.C.

(57) ABSTRACT

An electronic device is disclosed. The electronic device according to various embodiments comprises: a memory for storing data related to an application; a display comprising a first area in which a first sensor of a first method is disposed, and a second area in which a second sensor of the first method and a third sensor of a second method are disposed; and a processor, wherein the processor is set to display an object related to the application via the first area, detect a first input for the object, while the first sensor and
(Continued)

the second sensor are activated, deactivate the first sensor and the second sensor at least on the basis of the first input, and execute a specified function related to the application on the basis of a second input inputted according to the second method via the second area, while the third sensor is activated. Other various embodiments can be provided.

15 Claims, 12 Drawing Sheets

(58) Field of Classification Search
CPC .. H04N 19/162; H04N 19/167; H04N 19/176; H04N 19/186; H04N 5/3572; H04N 5/335; H04N 5/9201
See application file for complete search history.

(56) References Cited

U.S. PATENT DOCUMENTS

| | | |
|---|---|---|
| 2013/0002905 A1 | 1/2013 | Takakura et al. |
| 2013/0003842 A1* | 1/2013 | Kondo ................. H04N 19/513 375/240.14 |
| 2014/0198233 A1 | 7/2014 | Choi |
| 2016/0014312 A1 | 1/2016 | Nikkanen et al. |
| 2016/0329078 A1 | 11/2016 | Park et al. |
| 2017/0127034 A1 | 5/2017 | Urisaka |
| 2017/0155917 A1* | 6/2017 | Choi ...................... H04N 19/50 |
| 2018/0054633 A1* | 2/2018 | Okada .................. H04N 19/895 |
| 2021/0150287 A1* | 5/2021 | Baek ....................... G06N 7/005 |
| 2021/0195213 A1* | 6/2021 | Zhang .................. H04N 19/172 |

FOREIGN PATENT DOCUMENTS

| | | |
|---|---|---|
| KR | 1020170051274 | 5/2017 |
| KR | 101800702 | 11/2017 |

OTHER PUBLICATIONS

PCT/ISA/237 Written Opinion issued on PCT/KR2019/001703, dated May 24, 2019, pp. 6.

* cited by examiner

| COLOR CHANNEL | G | B | R |
|---|---|---|---|
| PARAMETER | 1 | 1 | 2 |
| BIT ASSIGNMENT RATE | 1 | 1 | 2 |

FIG.6

ELECTRONIC DEVICE FOR COMPRESSING IMAGE ACQUIRED BY USING CAMERA, AND OPERATION METHOD THEREFOR

CROSS-REFERENCE TO RELATED APPLICATION(S)

This application is a National Phase Entry of PCT International Application No. PCT/KR2019/001703, which was filed on Feb. 12, 2019 and claims priority to Korean Patent Application No. 10-2018-0017103, which was filed on Feb. 12, 2018 in the Korean Intellectual Property Office, the contents of which are incorporated herein by reference.

BACKGROUND

1. Field

Various embodiments of the present disclosure relate to an electronic device which processes an image obtained using a camera and an operation method thereof.

2. Description of the Related Art

When an electronic device that processes an image compresses an image obtained using an image sensor to transmit the image to a processor in the electronic device connected with the image sensor through an interface, the electronic device may compress the image in units of a plurality of regions included in the image at a designated compression rate and perform transmission.

Meanwhile, a service has been provided by an image processing cloud system for image backup and new media content generation. To speed up uploading to a cloud server, the electronic device may compress the image obtained using the image sensor at a designated compression rate and transmit the compressed image to a cloud system.

SUMMARY

When the electronic device compresses the image at the designated compression rate, the image is compressed without considering attribute information of the image, such that when assignment of more bits to a certain region of the image is required, a data loss occurs and thus recovery of the image transmitted to the processor or the cloud system may result in degradation in the display quality of the recovered image due to the data loss caused by the image compression.

Various embodiments may perform compression by differentiating bit assignment to each of a plurality of regions included in an image by using attribute information of the image, identified by image signal processing, when an electronic device compresses the image to reduce a loss occurring in compression of the image.

An electronic device according to various embodiments includes an image sensor, an image processor, and a control circuit electrically connected with the image sensor through a first interface and electrically connected with the image processor through a second interface, in which the control circuit is configured to obtain a first image and a second image for an external object by using the image sensor through the first interface, to transfer the first image to the image processor through the second interface such that the image processor determines attribute information related to correction of the first image, to receive the attribute information from the image processor, to compress the second image according to parameter information related to compression of the second image determined at least based on the attribute information, and to transfer the compressed second image to the image processor through the second interface.

An electronic device according to various embodiments includes an image processor and an image sensor module including an image sensor and a control circuit electrically connected with the image processor through a designated interface, in which the image sensor module is configured to obtain a first image and a second image for an external object by using the image sensor, to transfer the first image to the image processor by using the control circuit through the designated interface such that the image processor determines attribute information related to correction of the first image, to receive the attribute information from the image processor by using the control circuit, to compress the second image by using the control circuit, according to parameter information related to compression of the second image determined at least based on the attribute information, and to transfer the compressed second image to the image processor by using the control circuit through the designated interface.

An electronic device according to various embodiments includes a communication module, an image sensor, and a control circuit electrically connected with the image sensor, in which the control circuit is configured to obtain a first image and a second image for an external object by using the image sensor through the first interface, to transfer the first image to the external electronic device through the communication module such that an external electronic device determines attribute information related to correction of the first image, to receive the attribute information from the external electronic device, to compress the second image according to parameter information related to compression of the second image determined at least based on the attribute information, and to transfer the compressed second image to the external electronic device through the communication module.

According to various embodiments, an electronic device may efficiently assign a bit to each of a plurality of regions included in an image by using attribute information of the image when the electronic device compresses the image. In this way, a data loss occurring in image compression may be reduced.

BRIEF DESCRIPTION OF THE DRAWINGS

FIG. 6 is a flowchart of a configuration in which an electronic device assigns a bit to each color channel and compresses an image, according to various embodiments;

DETAILED DESCRIPTION

Figure 1:
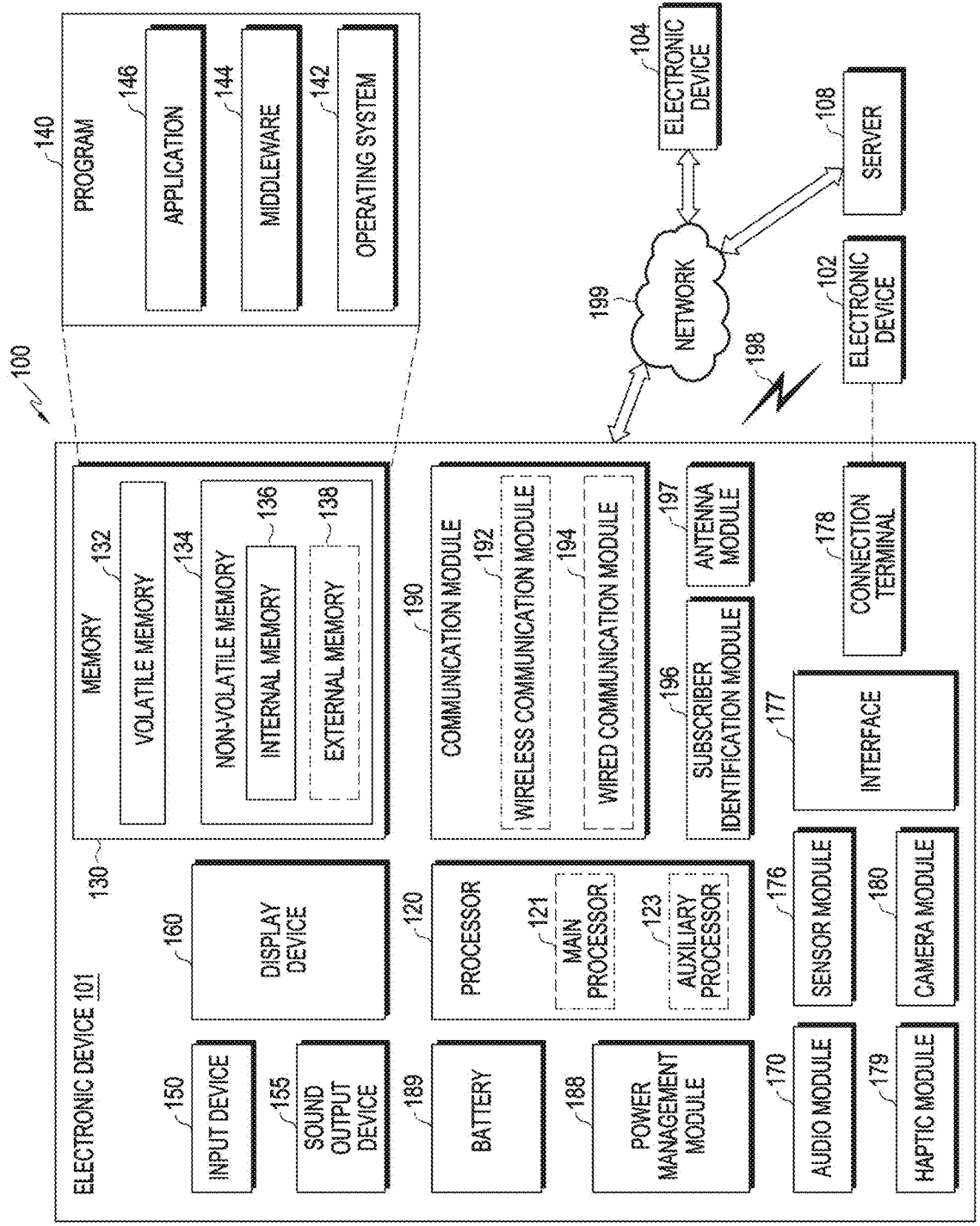
FIG. 1 illustrates a network environment including an electronic device according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wireless-Fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one or more antennas, and, therefrom, at least one antenna appropriate for a communication scheme used in the communication network, such as the first network 198 or the second network 199, may be selected, for example, by the communication module 190. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
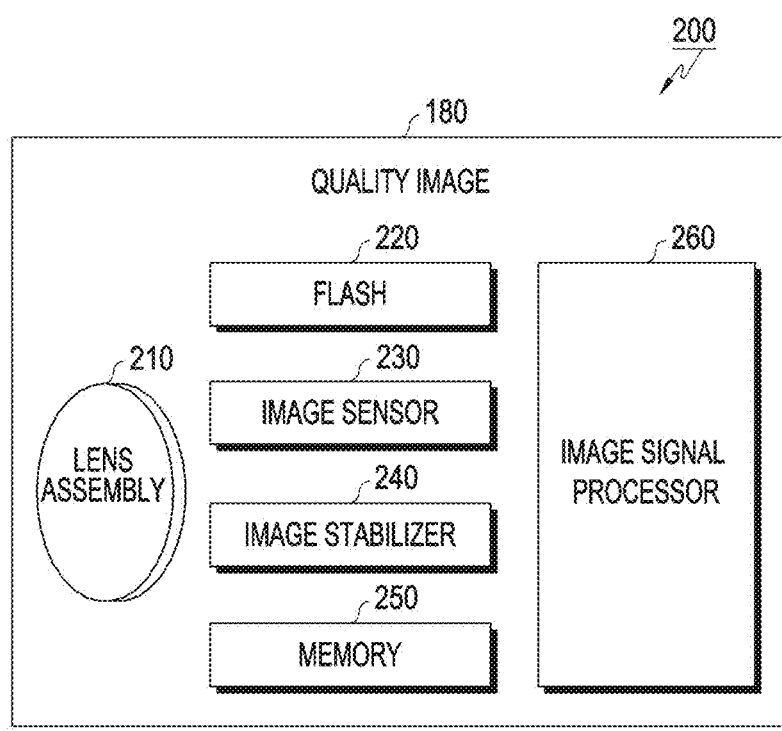
FIG. 2 is a block diagram of a camera module according to various embodiments.

FIG. 2 is a block diagram 200 of the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 160. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
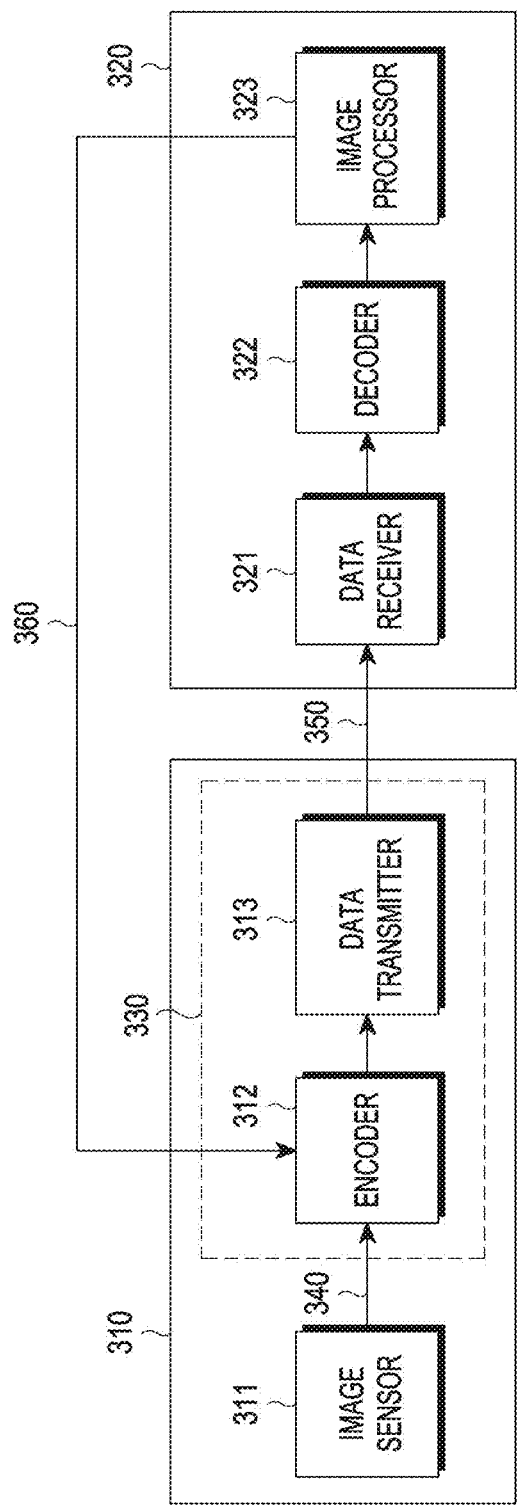
FIG. 3 is a block diagram of an electronic device according to various embodiments.

FIG. 3 is a block diagram of an electronic device according to various embodiments.

An electronic device (e.g., the electronic device 101 of FIG. 1) according to various embodiments of the present disclosure may include an image sensor module 310 including an image sensor 311 (e.g., the image sensor 230) and a control circuit 330, and a processor 320 (e.g., the processor 120 of FIG. 1). The image sensor 311 (e.g., the image sensor 230 of FIG. 2) may obtain an image corresponding to an external object by converting light transmitted from the external object via the lens assembly 210 into an electrical signal, as described with reference to FIG. 2. The control circuit 330 may include an encoder 312 for compressing an image obtained from the image sensor 311 through a first interface 340 and a data transmitter 313 for transmitting an image compressed using the encoder 312 to an image processor 323 (e.g., the image signal processor 260) included in the processor 320 through a second interface 350. For example, the encoder 312 may compress a raw image (e.g., Bayer data) received from the image sensor 311. The first interface 340 and the second interface 350 may be different interfaces. For example, the second interface 350 may be a mobile industry processor interface (MIPI).

According to various embodiments, the processor 320 may include a data receiver 321, a decoder 322, and the image processor 323. The data receiver 321 may receive the image compressed through the second interface 350 from the data transmitter 313 of the image sensor module 310. The decoder 322 may perform decoding for decompressing the compressed image received from the data receiver 321 to transmit the image to the image processor 323. In FIG. 3, the data receiver 321 and the decoder 322 are illustrated as separate components from the image processor 323, but the data receiver 321 and the decoder 322 may be arranged in the image processor 323 and may be configured as a part of the image processor 323, such that the image processor 323 may function as the data receiver 321 and the decoder 322. The image processor 323 may receive and correct the decoded image from the decoder 322. Moreover, the image processor 323 may identify attribute information related to correction of the image during correction. The attribute information may be related to various information such as color channel-related information, lens shading correction-related information, image gamma curve-related information, etc. However, in the present disclosure, the attribute information is not limited to the above-listed examples, and the image processor 323 may determine various attribute information. The image processor 323 may transmit the determined attribute information to the control circuit 330 through a third interface 360. The third interface 360 may be an interface that is different from the first interface 340 and the second interface 350. For example, the image processor 323 may transmit the attribute information determined by the encoder 312 that may perform compression on a frame next to a frame corresponding to an image transmitted previously, based on the received attribute information.

According to an embodiment, the image processor 323 may correct the image by using the determined attribute information.

Figure 4:
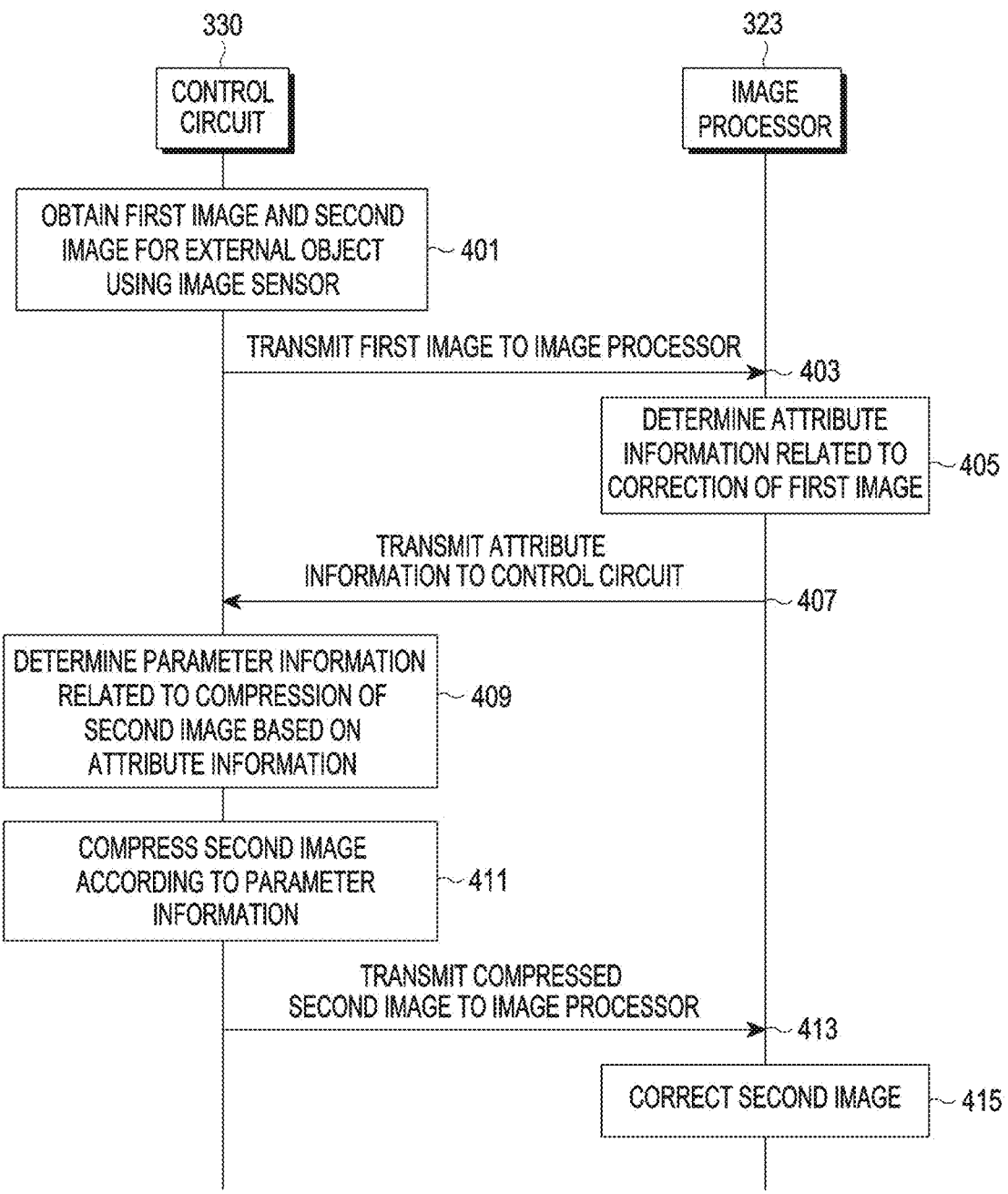
FIG. 4 is a flowchart of a configuration in which an electronic device processes an image obtained using a camera, according to various embodiments.

FIG. 4 is a flowchart of a configuration in which an electronic device processes an image obtained using a camera, according to various embodiments.

In operation 401, the control circuit 330 may obtain a first image and a second image for an external object by using the image sensor 311 (e.g., the image sensor 230). Herein, the second image may be an image obtained after the first image is obtained, that is, the first image and the second image may be captured by the image sensor 311 sequentially over time. The control circuit 330 may generate first compression data by compressing the first image using a first parameter, as a part of an operation of transmitting the first image to the image processor 323 (e.g., the image signal processor 260). The control circuit 330 may divide the first image into at least one regions (e.g., packets), determine the number of bits assigned to the respective regions, and set a parameter related to a set of the determined numbers of bits to the first parameter. The first parameter may be determined to have a uniform value for the at least one region of the first image, such that the same bit is assigned to each of the at least one region.

In operation 403, the control circuit 330 may transmit the first image to the image processor 323 through the second interface 350. More specifically, the encoder 312 may compress the first image by using the first parameter to generate the first compression data and transmit the first compression data to the data transmitter 313. The data transmitter 313 may transmit the first compression data to the processor 320 through the second interface (e.g., the MIPI) to transmit the first compression data to the image processor 323. The data receiver 321 of the processor 320 may receive the first compression data and transmit the first compression data to the decoder 322. The decoder 322 may decode the first compression data and transmit the decoded first compression data to the image processor 323. The processor 320 may receive the first compression data and the first parameter together from the image sensor module 310, and the decoder 322 may decode the first compression data into the first image by using the first compression data and the first parameter and transmit the first image to the image processor 323. In another embodiment of the present disclosure, the processor 320 may be configured to receive the first compression data and decode the received compression data.

In operation 405, the image processor 323 may identify attribute information related to correction of the first image. As described before, the image processor 323 may generate the attribute information related to at least one of complexity-related information, color channel-related information, color correction-related information, lens shading correction-related information, or gamma curve-related information of the first image, by using the first image. However, the attribute information is not limited to the above-listed information.

In operation 407, the image processor 323 may transmit the attribute information regarding the first image to the control circuit 330 through the third interface 360. In operation 409, the control circuit 330 may determine parameter information related to compression of the second image based on the attribute information related to correction of the first image. The image processor 323 may transmit the attribute information determined in relation to the first image to the control circuit 330 through the third interface 360. For example, the image processor 323 may transmit the attribute information to the encoder 312 included in the control circuit 330 to allow the encoder 312 to compress the second image based on the attribute information. The control circuit 330 may determine the parameter information related to compression of the second image based on attribute information related to at least one of complexity-related information, color channel-related information, color correction-related information, lens shading correction-related information, or gamma curve-related information of the first image. The parameter information related to compression of the second image may be related to the number of bits assigned to each of at least one region included in the second image. For example, the control circuit 330 may determine the number of bits assigned to each of the at least one region included in the second image in compression of the second image and determine the parameter information related to the determined number of bits.

In operation 411, the control circuit 330 may compress the second image based on the determined parameter information. The control circuit 330 may assign at least one bit to the at least one region included in the second image based on the determined parameter information to compress the second image. In operation 413, the control circuit 330 may transmit the compressed second image to the image processor 323. The control circuit 330 may transmit the second image compressed using the encoder 312 to the data receiver 321 through the second interface 350 by using the data transmitter 313. The decoder 322 may receive the compressed second image from the data receiver 321 and decode the compressed second image to transmit the decoded second image to the image processor 323. The image processor 323 may determine the attribute information related to correction of the second image. The attribute information related to correction of the second image may be related to at least one of complexity-related information of the second image, color channel-related information, color correction-related information, lens shading correction-related information, or gamma curve-related information of the first image.

In operation 415, the image processor 323 may correct the decoded second image. The image processor 323 may correct the second image by using the attribute information related to the second image. The image processor 323 may correct the second image by using at least one of attribute information related to the second image or information related to at least one image region related to the second image. The information related to at least one image region related to the second image may be related to at least one of a position of at least one object included in the second image, an object recognition result of at least one object, a reliability of an object recognition result of at least one object, a texture recognition result of at least one object, or an accuracy of the texture recognition result of at least one object.

Figure 5:
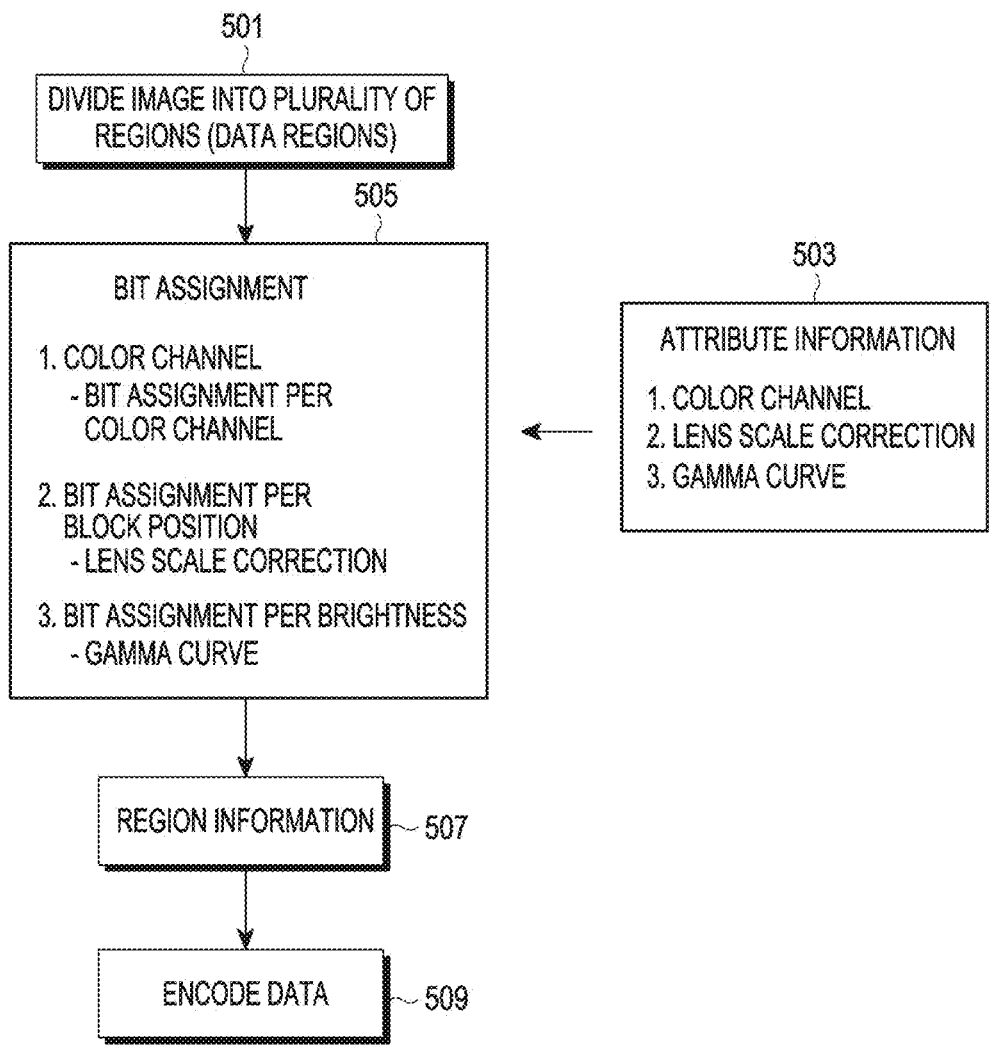
FIG. 5 is a diagram of a configuration in which an electronic device compresses an image obtained using a camera, according to various embodiments.

FIG. 5 is a diagram of a configuration in which an electronic device compresses an image obtained using a camera, according to various embodiments.

An electronic device (e.g., the electronic device 101 of FIG. 1) according to various embodiments may compress an image obtained using a camera based on attribute information. The control circuit (e.g., the control circuit 330 of FIG. 3) of the electronic device 101 may divide the compressed image into at least one region. When the control circuit 330 compresses data corresponding to an image, a region sensitive to compression in the image may be identified based on attribute information 503, such that more bits may be assigned to the region sensitive to compression to prevent a data loss in compression and less bits may be assigned to a region that is not sensitive to compression to prevent waste of data. Herein, when the region is sensitive to compression, it may mean that when the region is compressed at the same compression rate, a loss rate is high. The attribute information 503 may be related to various information such as information related to color channel, information related to lens shading correction, information related to image gamma curv, etc. The control circuit 330 may divide an image into a plurality of data blocks corresponding to a plurality of regions in operation 501, and determine the number of at least one bit to be assigned to a data block by using the image processor 323 (e.g., the image processor 260) in operation 505. For example, the control circuit 330 may determine the number of bits to be assigned to each color channel (auto white balance (AWB) or color correction (CC)), determine the number of bits to be assigned based on a position in an image of a block such as lens shading correction (LSC), or determine the number of bits to be assigned according to a brightness for each block in the image such as gamma curve of the image, etc.

According to an embodiment, the control circuit 330 may set a parameter based on the attribute information in operation 507, and perform encoding on data corresponding to the image based on the determined parameter in operation 509. The encoded image may be transmitted to the external electronic device (e.g., the electronic device 104 or the server 108) and decoded, and may be corrected by the image processor 323 to generate a final image, and in a process of generating the final image, the attribute information generated by the image processor 323 may be transmitted to the encoder 312 of the electronic device (e.g., the electronic device 101) for use in generation of parameter information related to compression of the second image.

FIG. 6 is a flowchart of a configuration in which an electronic device assigns a bit to each color channel and compresses an image, according to various embodiments.

The control circuit 330 of the electronic device according to various embodiments may assign a bit to each color channel and compress the image. For example, the control circuit 330 may use a gain multiplied to each color channel for auto white balance or color adjustment as information for assignment of a bit to a data block. For example, a bit assignment rate assigned to each color channel 610 in a data block corresponding to at least one region in an image may be adjusted according to a gain multiplied to each color channel 610. For example, when a ratio of channel G 611, channel B 612, and channel R 613 is set to G:B:R=1:1:2, a compression loss of the channel R 613 is two times higher than a compression loss of the channel G 611 and the channel B 612, such that more bits may be assigned to the channel R 613 in bit assignment to each channel of the control circuit 330 and the image may be compressed based on the assigned bit rate.

Figure 7A:
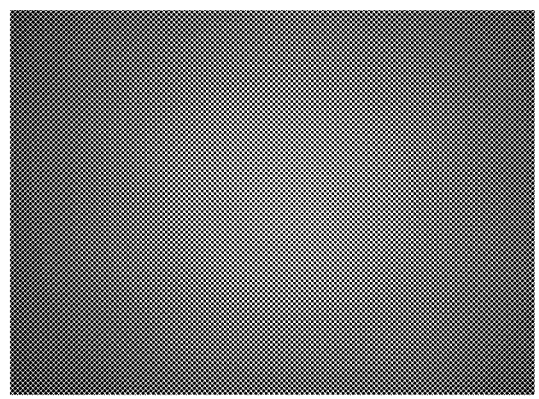
FIGS. 7A and 7B area diagram and a graph of characteristics of a lens with respect to a position of an image.
Figure 7B:
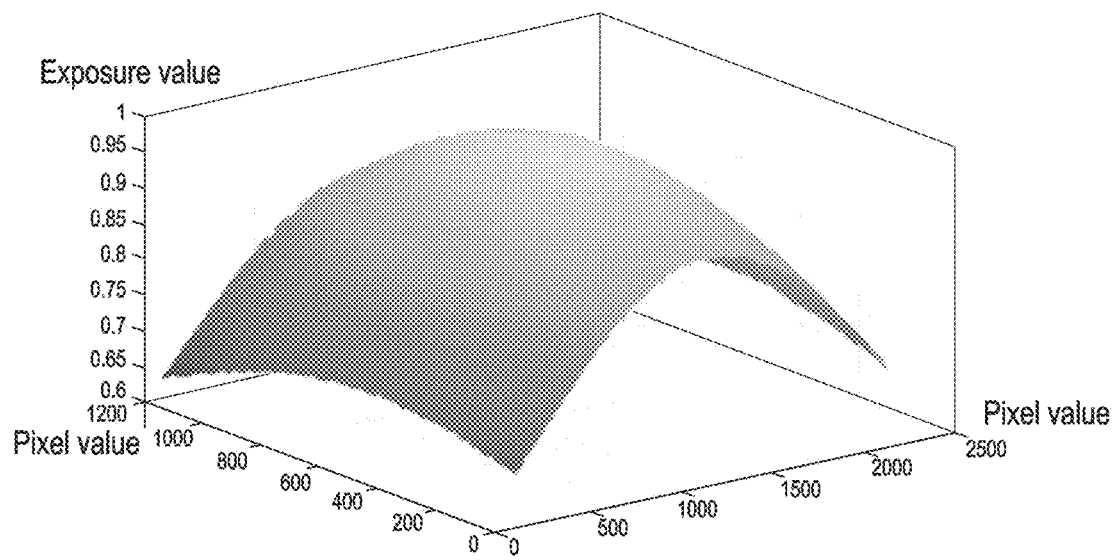

FIGS. 7A and 7B area diagram and a graph of characteristics of a lens with respect to a position of an image.

The control circuit 330 of the electronic device 101 according to various embodiments may determine bits to be assigned to a data block corresponding to at least one region in an image through, for example, lens shading correction, by reflecting lens characteristics. Referring to FIG. 7A, an outskirt region of the image may have a darker brightness than a central region of the image. Referring to FIG. 7B corresponding to lens shading characteristics corresponding to the lens of FIG. 7A, a pixel value for the outskirt region of the image having the darker brightness may be greater than that for the central region of the image. As a pixel value for a region included in the image increases, a loss may also increase in image compression, such that the control circuit 330 may assign more bits to a region having a greater pixel value to reduce a loss of bits.

Figure 8A:
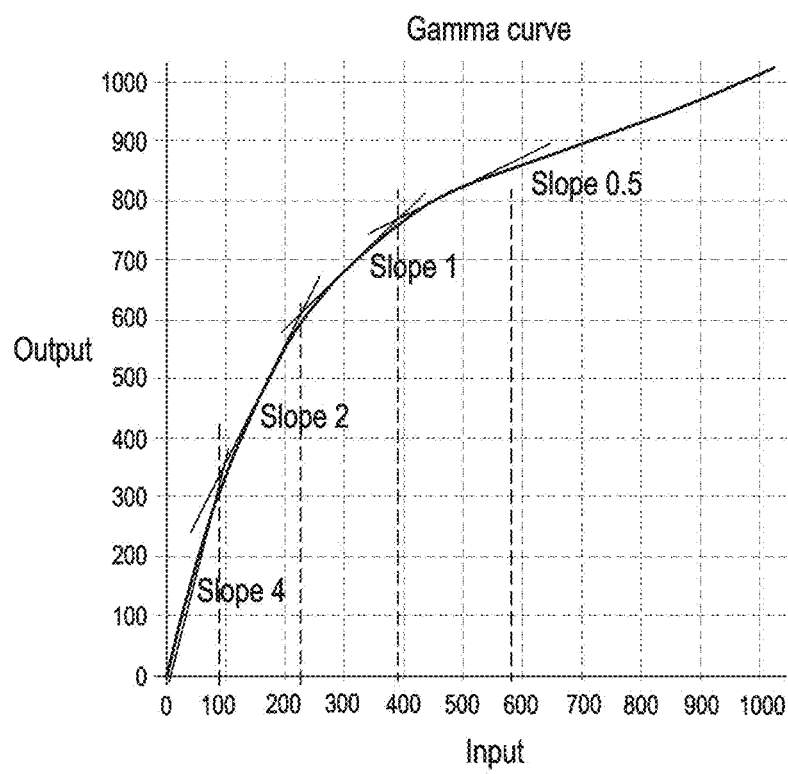
FIG. 8A is a diagram of a gamma curve of an image obtained by an electronic device using a camera, according to various embodiments.
Figure 8B:
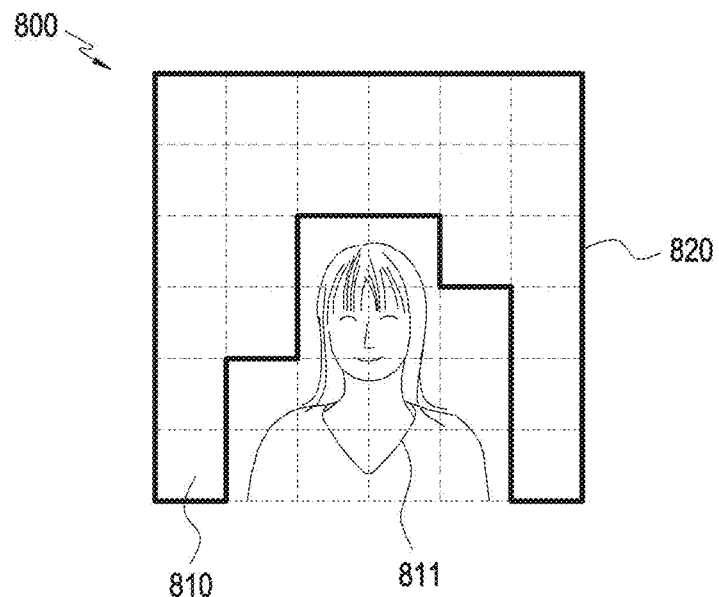
FIGS. 8B and 8C are diagrams of a component for assigning a bit to each region of an image, according to various embodiments.
Figure 8C:
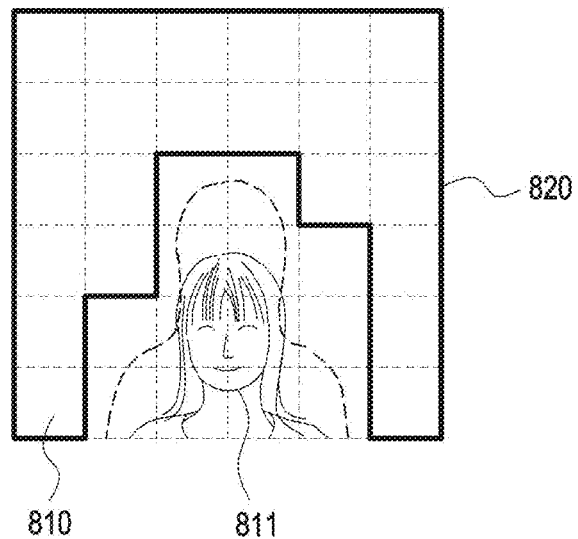

FIG. 8A is a diagram of a gamma curve of an image obtained by an electronic device using a camera, according to various embodiments. FIGS. 8B and 8C are diagrams of a component for assigning a bit to each region of an image, according to various embodiments.

The electronic device 101 according to various embodiments may assign a bit to each at least one region included in an image by using information related to a gamma curve of the image and perform encoding. Referring to the gamma curve of FIG. 8A, a compression loss may increase or decrease with respect to a pixel value of a pixel included in the image to affect the compressed image. For example, for the gamma curve of FIG. 8A, as a pixel value of an input image increases, a slope of the gamma curve may decrease. As the slope of the gamma curve increases, a bit loss may increase, such that more bits may be assigned than a region with a lower slope of the gamma curve, thus preventing a data loss. For example, an image 800 may include a first region 810 where a first object 811 is disposed and a second region 920 where the first object 811 is not disposed. The first region 810 may include the first object 811 that is highly likely to move like the change from FIG. 8B to FIG. 8C, such that a slope of an input image of the first region 810 including the first object 811 may be higher than a slope of an input image of the second region 820. The control circuit 330 may determine a parameter for each region based on the slope of the gamma curve of the input image and assign more bits to the first region 810 having the higher slope than the second region 820 based on the determined parameter. While bit assignment is made based on two divided regions, the first region 810 and the second region 820 in FIGS. 8B and 8C, the image may also be divided into two or more regions according to the slope of the gamma curve for bit assignment. The control circuit 330 may set a designated threshold value for the slope of the gamma curve to determine a region based on the threshold value, and assign a bit to the determined region.

Figure 9:
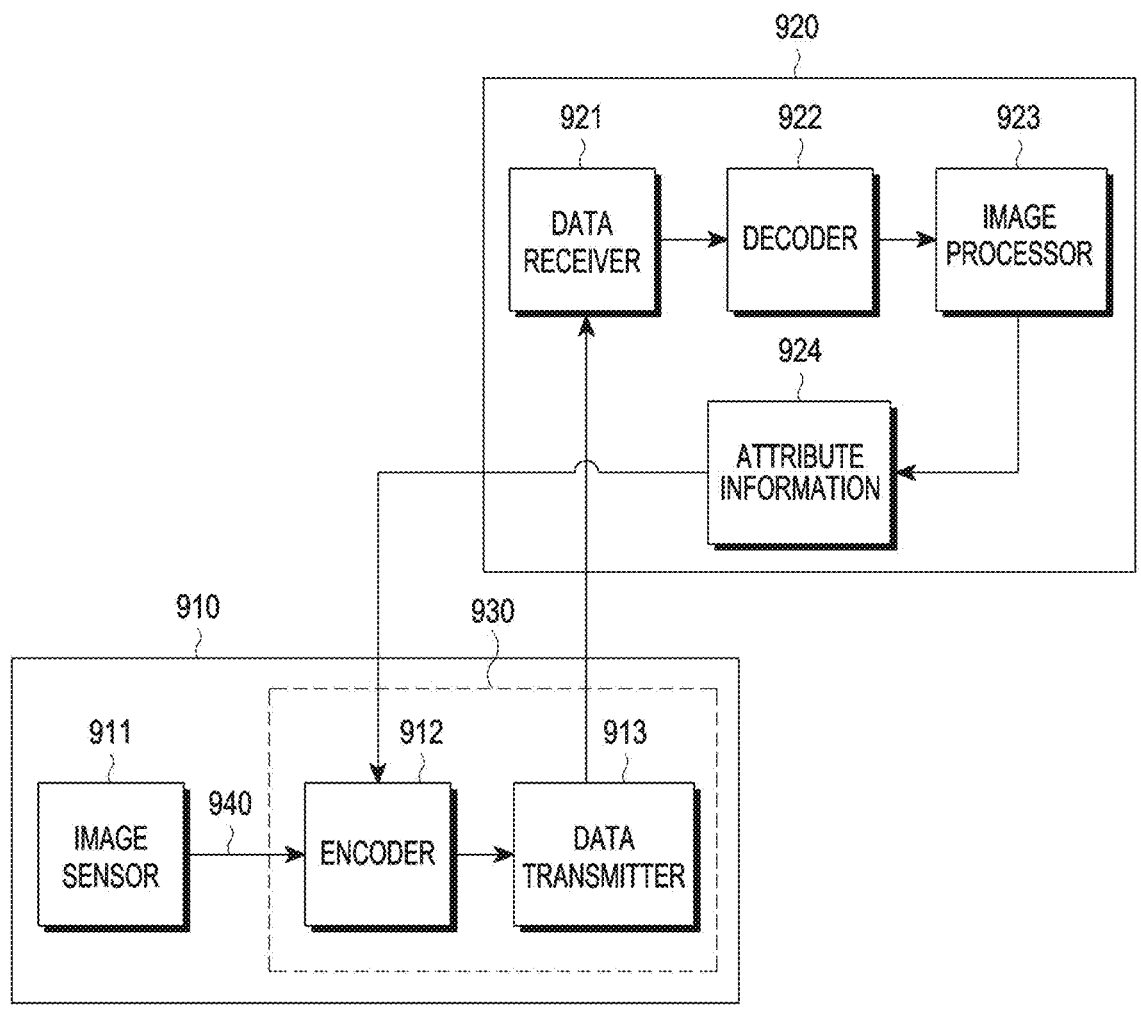
FIG. 9 is a block diagram of an electronic device and an external electronic device, according to various embodiments of the present disclosure.

FIG. 9 is a block diagram of an electronic device and an external electronic device, according to various embodiments of the present disclosure.

An electronic device 910 (e.g., the electronic device 101 of FIG. 1) according to various embodiments of the present disclosure may include an image sensor 911 and a control circuit 930. An external electronic device 920 may include a data receiver 921, a decoder 922, and an image processor 923 (e.g., the image signal processor 260). The image sensor 911 (e.g., the image sensor 230 of FIG. 2) may obtain an image corresponding to an external object by converting light transmitted from the external object via the lens assembly 210 into an electrical signal, as described with reference to FIG. 2. The control circuit 930 may include an encoder 912 for compressing an image obtained from the image sensor 911 through a first interface 940 and a data transmitter 913 for transmitting an image compressed using the encoder 912 to the image processor 923 included in the external electronic device 920 (e.g., the electronic device 104 or the server 108). For example, the encoder 912 may compress Bayer data received from the image sensor 911. According to implementations, the encoder 912 may be included in at least one of a camera module or an AP, and the data transmitter 913 may be implemented with a communication circuit (e.g., the communication module 190).

According to various embodiments, the data receiver 921 may receive the compressed image from the data transmitter 913 of the electronic device 910. The decoder 922 may perform decoding for decompressing the compressed image received from the data receiver 921 to transmit the image to the image processor 923. In FIG. 9, the data receiver 921 and the decoder 922 are illustrated as separate components from the image processor 923, but the data receiver 921 and the decoder 922 may be arranged in the image processor 923 and may be configured as a part of the image processor 923, such that the image processor 923 may function as the data receiver 921 and the decoder 922. The image processor 923 may receive the decoded image from the decoder 922 and determine attribute information 924 related to correction of the image. The attribute information may be related to various information such as information related to color channel, information related to lens shading correction, information related to image gamma curve, etc. However, in the present disclosure, the attribute information is not limited to the above-listed examples, and the image processor 923 may determine various attribute information. The image processor 923 may transmit the determined attribute information to the control circuit 930 through the second interface 360. For example, the image processor 923 may transmit the attribute information determined by the encoder 912 that may perform compression on a frame next to a frame corresponding to an image transmitted previously, based on the received attribute information. According to an embodiment, the image processor 923 may correct the image by using the determined attribute information.

Figure 10:
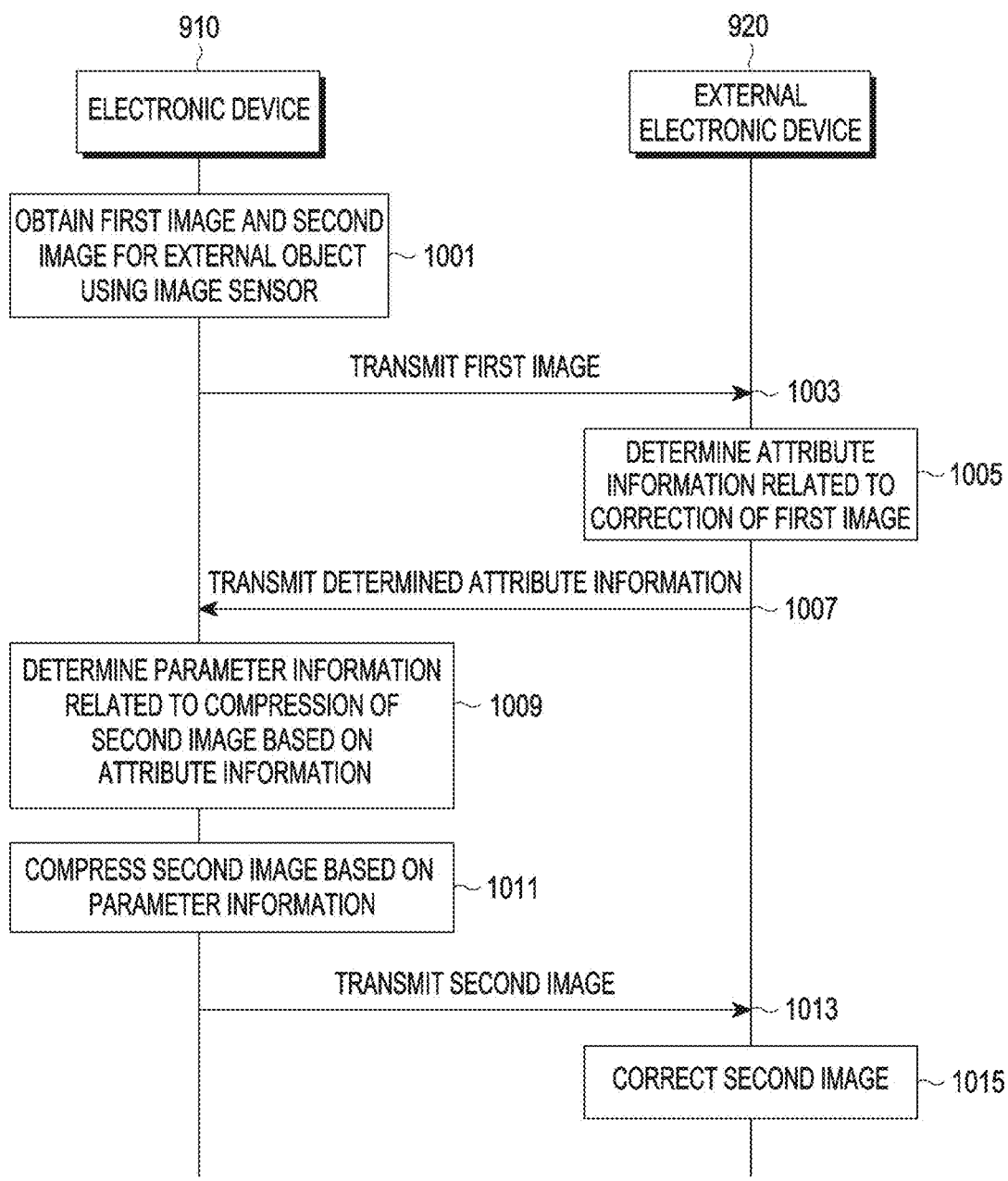
FIG. 10 is a flowchart of operations of an electronic device and an external electronic device, according to various embodiments.

FIG. 10 is a flowchart of operations of an electronic device and an external electronic device, according to various embodiments.

In operation 1001, the electronic device 910 (e.g., the electronic device 101 of FIG. 1) may obtain a first image and a second image for an external object by using the image sensor 911 (e.g., the image sensor 230 of FIG. 2). The electronic device 910 may generate first compression data by compressing the first image using a first parameter, as a part of an operation of transmitting the first image to the image processor 923 (e.g., the image signal processor 260). The electronic device 910 may divide the first image into at least one region, determine the number of bits assigned to the respective regions, and set a parameter related to a set of the determined numbers of bits to the first parameter. The first parameter may be determined based on information related to complexity of at least one region included in the first image, information related to color channel, information related to color correction, information related to lens shading correction, information related to gamma curve of the first image, etc. Alternatively, the first parameter may be determined to have a uniform value for at least one region of the first image.

In operation 1003, the electronic device 910 may transmit the first image to the external electronic device 920. The encoder 912 may compress the first image by using the first parameter to generate the first compression data and transmit the first compression data to the data transmitter 913. The data transmitter 913 may transmit the first compression data to the external electronic device 920 to transmit the first compression data to the image processor 923. The data receiver 921 of the external electronic device 920 may receive the first compression data and transmit the first compression data to the decoder 922. The decoder 922 may decode the first compression data and transmit the decoded first compression data to the image processor 923. The external electronic device 920 may receive the first compression data and the first parameter together from the electronic device 910, and the decoder 922 may decode the first compression data into the first image by using the first compression data and the first parameter and transmit the first image to the image processor 923.

In operation 1005, the external electronic device 920 may identify attribute information related to correction of the first image. As described before, the external electronic device 920 may generate the attribute information related to at least one of information related to complexity, information related to color channel, information related to color correction, information related to lens shading correction, or information related to gamma curve of the first image, by using the first image. However, the attribute information is not limited to the above-listed information.

In operation 1007, the external electronic device 920 may transmit the attribute information regarding the first image to the electronic device 910. In operation 1009, the electronic device 910 may determine parameter information related to compression of the second image based on the attribute information related to correction of the first image. The image processor 923 of the external electronic device 910 may transmit the attribute information determined in relation to the first image to the control circuit 930 through the third interface 960. For example, the image processor 923 may transmit the attribute information to the encoder 912 included in the control circuit 930 to allow the encoder 912 to compress the second image based on the attribute information. The control circuit 330 may determine the parameter information related to compression of the second image based on attribute information related to at least one of information related to complexity, information related to color channel, information related to color correction, information related to lens shading correction, or information related to gamma curve of the first image. The parameter information related to compression of the second image may be related to the number of bits assigned to each of at least one region included in the second image. For example, the control circuit 930 may determine the number of bits assigned to each of the at least one region included in the second image in compression of the second image and determine the parameter information related to the determined number of bits.

In operation 1011, the electronic device 910 may compress the second image based on the determined parameter information. The electronic device 910 may assign at least one bit to the at least one region included in the second image based on the determined parameter information to compress the second image. In operation 1013, the electronic device 910 may transmit the compressed second image to the external electronic device 920. The control circuit 930 may transmit the second image compressed using the encoder 312 to the data receiver 321 by using the data transmitter 913. The decoder 922 may receive the compressed second image from the data receiver 921 and decode the compressed second image to transmit the decoded second image to the image processor 923. The image processor 923 may determine the attribute information related to correction of the second image. The attribute information related to correction of the second image may be related to at least one of information related to complexity of the second image, information related to color channel, information related to color correction, information related to lens shading correction, or information related to gamma curve of the first image.

In operation 1015, the external electronic device 920 may correct the decoded second image. The image processor 923 may correct the second image by using the attribute information related to the second image. The image processor 923 may correct the second image by using at least one of attribute information related to the second image or information related to at least one image region related to the second image. The information related to at least one image region related to the second image may be related to at least one of a position of at least one object included in the second image, an object recognition result of at least one object, a reliability of an object recognition result of at least one object, a texture recognition result of at least one object, or an accuracy of the texture recognition result of at least one object.

According to various embodiments, the control circuit 930 may compress the first image and transmit the compressed first image to the external electronic device 920 through a communication module. The image processor 923 of the external electronic device 920 may generate information related to a plurality of image regions included in the first image decoded by the decoder 922, e.g., correction region information including at least one of coordinate information or a recognition result of the image region. The image processor 923 may transmit the generated correction region information to the control circuit 930 of the electronic device 910. The control circuit 930 may determine a parameter for assigning a bit to a plurality of image regions based on the received correction region information and compress the second image by using the determined parameter. The control circuit 930 may transmit the compressed second image to the external electronic device 920 by using the communication module. The decoder 922 of the external electronic device 920 may decode the compressed second image and transmit the decoded second image to the image processor 923 that may generate the correction region information regarding the second image and transmit the generated correction region information to the control circuit 930. According to an embodiment, the image processor 923 may correct the second image by using the correction region information regarding the second image.

Figure 11:
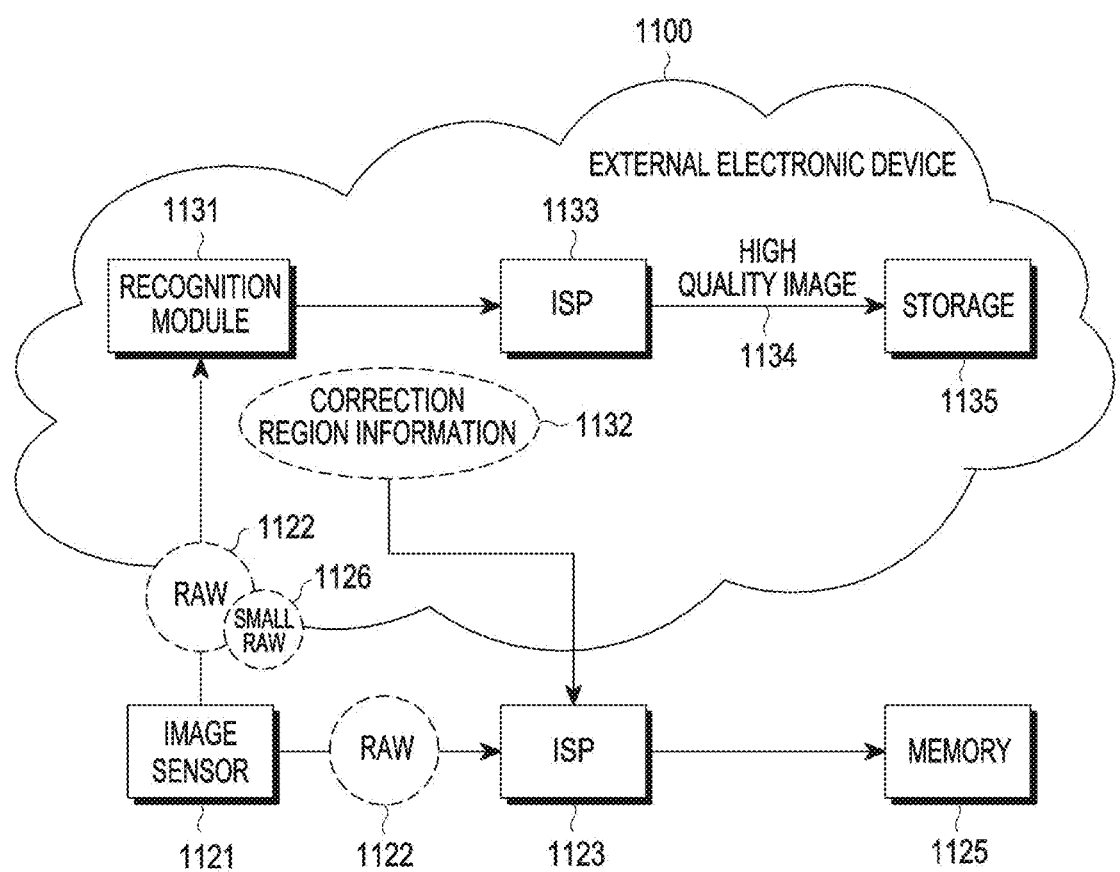
FIG. 11 is a diagram for describing operations of an electronic device and an external electronic device, according to various embodiments.

FIG. 11 is a diagram for describing operations of an electronic device and an external electronic device, according to various embodiments.

The electronic device 101 may include an image sensor 1121, an image signal processor (ISP) 1123, and a memory 1125. The external electronic device 1100 may include the recognition module 1131, the ISP 1133, and a storage 1135. The recognition module 1131 may be a logic module and may be implemented with a processor of the external electronic device 1100. The ISP 1133 may also be implemented with a processor of the external electronic device 1100, and for example, a processor of the external electronic device 100 may perform both recognition and image processing. Although not shown, the electronic device 101 may include a communication module (e.g., the communication interface 170 or the communication module 220) capable of transmitting and receiving data to and from an external electronic device 1100. The external electronic device 1100 may include a communication module capable of transmitting and receiving data to and from the electronic device 101.

The image sensor 1121 (e.g., the camera module 291) may obtain an image regarding an external object and generate a raw image 1122 (a native image) corresponding to the obtained image. The image sensor 1121 may deliver the raw image 1122 to the ISP 1123. According to various embodiments, the image sensor 1121 may generate the small raw image 1126 and transmit the same to the external electronic device 1100 through the communication module. According to another embodiment, the processor 327 of the electronic device 101 instead of the image sensor 1121 may generate the small raw image 1126 and transmit the generated small raw image 1126 to the external electronic device 1100 through the communication module. The image sensor 1121 may transmit the raw image 1122 in a compressed state to the ISP 1123 or the external electronic device 1100. The image sensor 1121 may compress the raw image 1122 for partial processing with respect to the same and store the compressed raw image 312 in an internal memory of the image sensor 1121. The recognition module 1131 of the external electronic device 1100 may obtain the small raw image 1126 through the communication module, and segment at least one image region from the small raw image 1126. The recognition module 1131 may recognize each of at least one image region divided as a result of segmentation. Correction region information 1132 may be generated, which includes information related to a plurality of image regions generated from the recognition module 1131, e.g., coordinate information or a recognition result of an image region. The correction region information 1132 may be transmitted to the electronic device 101. The ISP 1123 may correct the raw image 1122 by using the correction region information 1132, thus generating a corrected image. The enhanced image may have, for example, a format of YUV. The enhanced image may be stored in the memory 1125. The enhanced image may be compressed according to, for example, the Joint Photographic Experts Group (JPEG) scheme, and the compressed image may be stored in the memory 1125.

In various embodiments of the present disclosure, the raw image 1122 provided from the image sensor 121 may be transmitted to the external electronic device 1100 separately from the small raw image 1126. The raw image 1122 has a larger volume than the small raw image 1126, such that the small raw image 121 may be first transmitted to the external electronic device 1100 and then the raw image 1122 may be transmitted to the external electronic device 1100. For example, when the ISP 1123 performs correction on the raw image 1122, the raw image 1122 may be transmitted to the external electronic device 1100. The raw image 1122 may be uploaded to the external electronic device 1100 in the original form generated by the image sensor 1126 or may be uploaded after being pre-processed by lens distortion compensation or noise cancellation. The pre-processing may be performed in the external electronic device 1100. The external electronic device 1100 may perform pre-processing for demosaic processing or image format change, or pre-processing for improving an image recognition rate. The ISP 1133 of the external electronic device 1100 may correct the received raw image 1122. The external electronic device 1100 may correct the raw image 1122 by using the existing generated correction region information 1132 or by using scaled correction region information. The raw image 1122 may have a higher resolution than the small raw image 1126, such that the ISP 1133 of the external electronic device 1100 may obtain detailed scaled correction region information from the high-resolution image. The ISP 1133 may generate the scaled correction region information by using the existing generated correction region information and the raw image 1122. The ISP 1133 may obtain a high-quality image 1134 by enhancing the raw image 1122 using the scaled correction region information. The high-quality image 1134 may be stored in the storage 1135 of the external electronic device 1100, and may be downloaded in the electronic device 101.

According to various embodiments, the electronic device 101 may generate the small raw image of the second image based on the correction region information 1132 regarding the first image. For example, the correction region information 1132 of the first image may include information indicating that a texture of a certain region of the first image is of a high complexity. When the electronic device 101 generates the small raw image of the second image through compression, a higher bit may be assigned to a corresponding region of the second image for compression.

An electronic device (e.g., the electronic device 101 of FIG. 1) according to various embodiments includes an image sensor (e.g., the image sensor 311 of FIG. 3), an image processor (e.g., the image processor 323 of FIG. 3), and a control circuit (e.g., the control circuit 330 of FIG. 3) electrically connected with the image sensor 311 through a first interface and electrically connected with the image processor (e.g., the image processor 323 of FIG. 3) through a second interface, in which the control circuit is configured to obtain a first image and a second image for an external object by using the image sensor 311 through the first interface, to transfer the first image to the image processor 323 through the second interface such that the image processor 323 determines attribute information related to correction of the first image, to receive the attribute information from the image processor 323, to compress the second image according to parameter information related to compression of the second image determined at least based on the attribute information, and to transfer the compressed second image to the image processor 323 through the second interface.

According to an embodiment, the control circuit 330 may be configured to generate first compression data by compressing the first image using a first parameter and transfer the first compression data as the first image to the image processor 323, as a part of the transferring of the first image to the image processor 323. According to an embodiment, the image processor 323 may decode the compressed second image received through the second interface. According to an embodiment, the image processor 323 may correct the second image at least based on attribute information related to correction of the first image. According to an embodiment, the control circuit may be configured to determine the attribute information based on at least one of information related to auto white balance (AWB), information related to color correction (CC), information related to lens shading correction (LSC), or information related to gamma curve of the first image. According to an embodiment, the control circuit 930 may be configured to assign a bit to each region included in the second image at least based on a parameter related to compression of the second image to compress the second image. According to an embodiment, the control circuit 330 may be configured to receive the attribute information from the image processor through a third interface that is different from the second interface.

The electronic device 101 according to various embodiments may include the image processor 323 and the image sensor module 310 including the image sensor 311 and the control circuit 330 and electrically connected with the image processor 323 and the control circuit through a designated interface, in which the image sensor module 310 may be configured to obtain a first image and a second image for an external object by using the image sensor, to transfer the first image to the image processor by using the control circuit through the designated interface such that the image processor 323 determines attribute information related to correction of the first image, to receive the attribute information from the image processor 323 by using the control circuit, to compress the second image by using the control circuit 330, according to parameter information related to compression of the second image determined at least based on the attribute information, and to transfer the compressed second image to the image processor 323 by using the control circuit 330 through the designated interface.

According to an embodiment, the control circuit 330 may be configured to generate first compression data by compressing the first image using a first parameter and transfer the first compression data as the first image to the image processor, as a part of the transferring of the first image to the image processor. According to an embodiment, the image processor 323 may decode the compressed second image received through the second interface. According to an embodiment, the image processor 323 may correct the second image at least based on attribute information related to correction of the first image. According to an embodiment, the control circuit may be configured to determine the attribute information based on at least one of information related to auto white balance (AWB), information related to color correction (CC), information related to lens shading correction (LSC), or information related to gamma curve of the first image. According to an embodiment, the control circuit 330 may be configured to assign a bit to each region included in the second image at least based on a parameter related to compression of the second image to compress the second image. According to an embodiment, the control circuit 330 may be configured to receive the attribute information from the image processor 323 through a third interface that is different from the second interface.

An electronic device according to various embodiments may include a communication module (e.g., the communication module 170 of FIG. 1), an image sensor (e.g., the image sensor 911 of FIG. 9), and a control circuit (e.g., the control circuit 930 of FIG. 9) electrically connected with the image sensor 911, in which the control circuit 930 may be configured to obtain a first image and a second image for an external object by using the image sensor 911 through the first interface, to transfer the first image to the external electronic device through the communication module such that an external electronic device 920 determines attribute information related to correction of the first image, to receive the attribute information from the external electronic device 920, to compress the second image according to parameter information related to compression of the second image determined at least based on the attribute information, and to transfer the compressed second image to the external electronic device 920 through the communication module 170.

According to an embodiment, the control circuit 930 may be configured to generate first compression data by compressing the first image using a first parameter and transfer the first compression data as the first image to the external electronic device 920, as a part of the transferring of the first image to the external electronic device 920. According to an embodiment, the control circuit 930 may be configured to receive through the communication module 170, a third image generated by the external electronic device 920 through decoding of the compressed second image. According to an embodiment, the control circuit 930 may be configured to receive through the communication module, a fourth image generated by the external electronic device 920 through correction of the compressed second image at least based on attribute information related to correction of the first image. According to an embodiment, the control circuit may be configured to determine the attribute information based on at least one of information related to AWB, information related to CC, information related to LSC, or information related to gamma curve of the first image.

According to an embodiment, the control circuit 930 may be configured to assign a bit to each region included in the second image at least based on the parameter to compress the second image.

An electronic device according to various embodiments may be one of various types of electronic devices, according to various embodiments of the present disclosure. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1$^{st}$" and "2$^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
an image sensor;
an image processor; and
a control circuit electrically connected with the image sensor through a first interface and electrically connected with the image processor through a second interface,
wherein the control circuit is configured to:
obtain a first image and a second image for an external object by using the image sensor through the first interface,
transfer the first image to the image processor through the second interface such that the image processor determines attribute information related to correction of the first image,
receive the attribute information from the image processor,
compress the second image according to parameter information related to compression of the second image determined at least based on the attribute information, and
transfer the compressed second image to the image processor through the second interface.

2. The electronic device of claim 1, wherein the control circuit is configured to generate first compression data by compressing the first image using a first parameter and transfer the first compression data as the first image to the image processor, as a part of the transferring of the first image to the image processor.

3. The electronic device of claim 1, wherein the image processor is configured to decode the compressed second image received through the second interface.

4. The electronic device of claim 3, wherein the image processor is configured to correct the second image at least based on attribute information related to correction of the first image.

5. The electronic device of claim 1, wherein the control circuit is configured to determine the attribute information based on at least one of information related to auto white balance (AWB), information related to color correction (CC), lens information related to shading correction (LSC), or information related to gamma curve of the first image.

6. The electronic device of claim 1, wherein the control circuit is configured to assign a bit to each region included in the second image at least based on a parameter related to the compression of the second image to compress the second image.

7. The electronic device of claim 1, wherein the control circuit is configured to receive the attribute information from the image processor through a third interface that is different from the second interface.

8. An electronic device comprising:
an image processor; and
an image sensor module comprising an image sensor and a control circuit, the control circuit electrically connected with the image processor through a designated interface,
wherein the image sensor module is configured to:
obtain a first image and a second image for an external object by using the image sensor,
transfer the first image to the image processor by using the control circuit through the designated interface such that the image processor determines attribute information related to correction of the first image,
receive the attribute information from the image processor by using the control circuit,
compress the second image by using the control circuit, according to parameter information related to compression of the second image determined at least based on the attribute information, and
transfer the compressed second image to the image processor by using the control circuit through the designated interface.

9. The electronic device of claim 8, wherein the control circuit is configured to generate first compression data by compressing the first image using a first parameter and transfer the first compression data as the first image to the image processor, as a part of the transferring of the first image to the image processor.

10. The electronic device of claim 8, wherein the image processor is configured to decode the compressed second image received through the second interface.

11. The electronic device of claim 10, wherein the image processor is configured to correct the second image at least based on attribute information related to correction of the first image.

12. The electronic device of claim 8, wherein the control circuit is configured to determine the attribute information based on at least one of information related to auto white balance (AWB), information related to color correction (CC), information related to lens shading correction (LSC), or information related to gamma curve of the first image.

13. The electronic device of claim 8, wherein the control circuit is configured to assign a bit to each region included in the second image at least based on a parameter related to the compression of the second image to compress the second image.

14. The electronic device of claim 13, wherein the control circuit is configured to receive the attribute information from the image processor through a third interface that is different from the designated interface.

15. An electronic device comprising:
a communication module;
an image sensor; and
a control circuit electrically connected with the image sensor, wherein the control circuit is configured to:
obtain a first image and a second image for an external object by using the image sensor through a first interface,
transfer the first image to an external electronic device through the communication module such that the external electronic device determines attribute information related to correction of the first image, receive the attribute information from the external electronic device, compress the second image according to parameter information related to compression of the second image determined at least based on the attribute information, and transfer the compressed second image to the external electronic device through the communication module.

* * * * *